US007617960B2

(12) United States Patent
Clark

(10) Patent No.: US 7,617,960 B2

(45) Date of Patent: Nov. 17, 2009

(54) TOOL MOUNTING DEVICE AND METHOD OF MOUNTING A TOOL

(76) Inventor: Gary Clark, 196 N. Main St., Middleton, MA (US) 01949

( * ) Notice: Subject to any disclaimer, the term of this patent is extended or adjusted under 35 U.S.C. 154(b) by 0 days.

(21) Appl. No.: 11/490,829

(22) Filed: Jul. 21, 2006

(65) Prior Publication Data

US 2008/0017688 A1 Jan. 24, 2008

(51) Int. Cl.
*B23B 45/14* (2006.01)

(52) U.S. Cl. ....................... 227/156; 227/130; 227/120; 224/904; 224/929; 173/170; 173/171

(58) Field of Classification Search ................. 227/130, 227/156, 120; 224/904, 929, 250; 173/170, 173/171

See application file for complete search history.

(56) References Cited

U.S. PATENT DOCUMENTS

| | | | | |
|---|---|---|---|---|
| 175,407 | A | 3/1876 | Beaumont | |
| 3,100,590 | A * | 8/1963 | Bohlsen | 224/242 |
| 3,384,277 | A * | 5/1968 | Hodelka | 224/242 |
| 4,015,809 | A | 4/1977 | Buril | 248/217.2 |
| 4,060,215 | A | 11/1977 | Burns et al. | 248/360 |
| 4,463,413 | A | 7/1984 | Shirley | 362/401 |
| 4,823,912 | A | 4/1989 | Gould et al. | 182/214 |
| 4,830,247 | A * | 5/1989 | Banks | 224/666 |
| 5,154,383 | A | 10/1992 | Collinson | 248/211 |
| 5,213,413 | A | 5/1993 | Weathers | 362/431 |
| 5,265,312 | A * | 11/1993 | Okumura | 24/3.12 |
| 5,303,891 | A | 4/1994 | Powers | 248/218.4 |
| 5,609,283 | A * | 3/1997 | Harrison, Jr. | 224/678 |
| 5,845,743 | A | 12/1998 | Dechant | 182/187 |
| 6,045,017 | A * | 4/2000 | Connell | 224/148.7 |
| 6,098,552 | A | 8/2000 | Gunderson | 108/108 |
| 6,497,352 | B2 * | 12/2002 | Grover | 224/575 |
| 6,499,637 | B1 * | 12/2002 | Zamarron | 224/251 |
| 6,641,011 | B1 * | 11/2003 | Kahn | 224/269 |
| 6,657,739 | B1 * | 12/2003 | Grant et al. | 358/1.12 |
| 6,848,605 | B2 * | 2/2005 | Dillenberger | 224/670 |
| 7,143,841 | B2 * | 12/2006 | Etter et al. | 173/170 |
| 7,195,140 | B1 * | 3/2007 | Marinelli | 224/222 |
| 7,222,767 | B1 * | 5/2007 | Yang | 227/130 |
| 2003/0226944 | A1 * | 12/2003 | Sode | 248/243 |

* cited by examiner

*Primary Examiner*—Rinaldi I. Rada
*Assistant Examiner*—Michelle Lopez
(74) *Attorney, Agent, or Firm*—Burns & Levinson, LLP; Jacob N. Erlich, Esq.; Janine M. Susan

(57) ABSTRACT

A device and method for temporarily mounting a tool to a member such as an upright board without the need for any prior attachments to the board. A member securing element attached to the tool is secured to the upright board when gripping surfaces engage opposite sides of the board as a result of rotation of the tool brought about by an off-set center of gravity.

15 Claims, 16 Drawing Sheets

TOOL MOUNTING DEVICE AND METHOD OF MOUNTING A TOOL

FIELD OF THE INVENTION

The present invention relates generally to the field of tools, and, more particularly, to a device and method for temporarily mounting a tool to an upright board without the need for any prior attachments.

BACKGROUND OF THE INVENTION

During construction of a building, a workman must regularly interrupt the task at hand in order to do another. Often, he must put down the tool that he had been using and pick up another. As a hazardous situation could result from leaving the tool on the ground or floor unattended, the workman usually arranges to suspend the idle tool.

The most common device used by a workman, such as a carpenter working at framing a building, with which to temporarily hang a power tool, is a nail driven temporarily into a stud, rafter or floor joist. This requires that the workman first drive a nail into the board and, after using it, remove the nail. Such tool mounting diverts an appreciable amount of the workman's time to a non-productive activity, as he must repeatedly insert and remove nails as his work takes him to different areas of the work site.

There is a need for a tool mounting device attached to or part of the tool that does not interfere with the use of the tool and that is capable of temporarily gripping a suitable support such as a framing board, wherever the workman chooses, by a simple one handed action of the workman, so the tool is hung securely on the board. Furthermore, the tool mounting device should allow the workman to retrieve his tool by a simple one handed action. Also, the device must fit and be able to grip the commonly used boards or other structural members used at the work site.

SUMMARY OF THE INVENTION

The needs of the invention set forth above as well as further and other needs and advantages of the present invention are achieved by the embodiments of the invention described herein below.

According to one aspect of the present invention, a method for removably mounting a tool with an off-set center of gravity onto a member includes coupling the tool to a tool mounting device, such that the off-set center of gravity extends from the tool mounting device and situating the tool mounting device with respect to the member such that the off-set center of gravity assists in positioning the tool mounting device with respect to the member in such a manner that the tool mounting device becomes securely held in place with respect to the member until removal of the tool mounting device.

In some embodiments according to the present invention, the step of positioning the tool mounting device with respect to the member includes permitting gravity to rotate the tool and the tool mounting device with respect to the member. In other embodiments according to the present invention, the method further includes counter-positioning the tool mounting device. Counter-positioning may include counter-rotating the tool mounting device. The method may also include removing the tool mounting device from the member, where removing the tool mounting device from the member may be in a direction substantially perpendicular to the member.

In further embodiments according to the present invention, situating the tool mounting device with respect to the member may include placing the tool mounting device against the member from a side of the member. At least an opposite side of the member may remain unobstructed by the in-place tool mounting device. Situating the tool mounting device with respect to the member may include gripping a lateral side and an opposite lateral side of the member with the tool mounting device where the lateral side and the opposite lateral side are substantially perpendicular to the side and the opposite side.

In certain embodiments according to the present invention, the member may be substantially vertical. The member may be a stud or a stile of a ladder.

According to another aspect of the present invention, a combination tool and tool mounting device includes a tool having an off-set center-of-gravity and tool mounting device having a tool fastening element, to removably secure said tool mounting device to the tool, and a member securing element having at least two gripping surfaces. The gripping surfaces are capable of engaging the member when the member is located between the gripping surfaces and the tool mounting device rotates. Rotation of the tool mounting device by the off-set center of gravity of the tool causes the gripping surfaces to engage the member.

In some embodiments according to the present invention, the at least two gripping surfaces may include a first gripping surface and a second gripping surface, respectively. The first gripping surface may be displaced longitudinally from the second gripping surface along an axis of the tool and the second gripping surface may be closer to the tool off-set center-of-gravity than the first gripping surface.

The first gripping surface may be displaced laterally to one side of the axis of the tool and the second gripping surface may be displaced laterally to an opposite side of the axis of said tool. The off-set center-of-gravity of the tool may be located on the opposite side of the axis of the tool.

According to a further aspect of the present invention, a combination of a tool and at least two member securing elements includes a tool having an off-set center-of-gravity and at least two member securing elements coupled to the tool and including a first member securing element having a first gripping surface and a second member securing element having a second gripping surface. The first gripping surface and the second gripping surface are capable of engaging a member when the member is located between the first gripping surface and the second gripping surface and the tool rotates, where rotation of the tool by the off-set center of gravity of the tool causes the first gripping surface and the second gripping surface to engage the member.

In some embodiments according to the present invention, the tool further includes a set of couplers and another set of couplers, where the set of couplers and the other set of couplers are displaced longitudinally along a tool axis. The first member securing element may include a plurality of holes, at least one of the plurality of holes alignable with at least one of the set of couplers. The second member securing element may include another plurality of holes, at least one of the another plurality of holes alignable with at least one of the other set of couplers.

In other embodiments according to the present invention, an outline of the first member securing element may be the same as an outline of the second securing element.

In additional embodiments according to the present invention, the first member securing element may include a gripping portion including the first gripping surface and one or more gripping portion hinge elements, a retaining portion including at least two holes and one or more retaining portion hinge elements, and a pin coupling the one or more gripping portion hinge elements with the one or more retaining portion hinge elements, and a stop coupled to said gripping portion. The stop may restrict an interior angle between the gripping portion and the retaining portion to less than substantially 180°.

The second member securing element may include another gripping portion including the second gripping surface and another one or more gripping portion hinge elements, another retaining portion including another at least two clearance holes and another one or more retaining portion hinge elements, a pin coupling the another one or more gripping portion hinge elements with the another one or more retaining portion hinge elements, and a stop coupled to the another gripping portion. The stop may restrict an interior angle between the another gripping portion and the another retaining portion to less than substantially 180°.

According to a certain aspect according to the present invention, a tool mounting device includes at least one removable tool fastening element and a member securing element coupled to the at least one removable tool fastening element. The member securing element includes two or more gripping surfaces displaced longitudinally and laterally from one another.

In certain embodiments according to the present invention, the removable tool fastening element may be a pipe cinch. In other embodiments according to the present invention, the removable tool fastening element may be a strap, including a resilient strap. In further embodiments according to the present invention, the two or more gripping surfaces may include at least one element tapering to a point. In additional embodiments according to the present invention, the tool mounting device may include a slip-resistant layer, which may be Velcro®.

For a better understanding of the present invention, together with other and further objects thereof, reference is made to the accompanying drawings and detailed description and its scope will be pointed out in the appended claims.

BRIEF DESCRIPTION OF THE DRAWINGS

For a better understanding of the present invention, reference is made to the figures, in which.

DETAILED DESCRIPTION OF THE INVENTION

Figure 1:
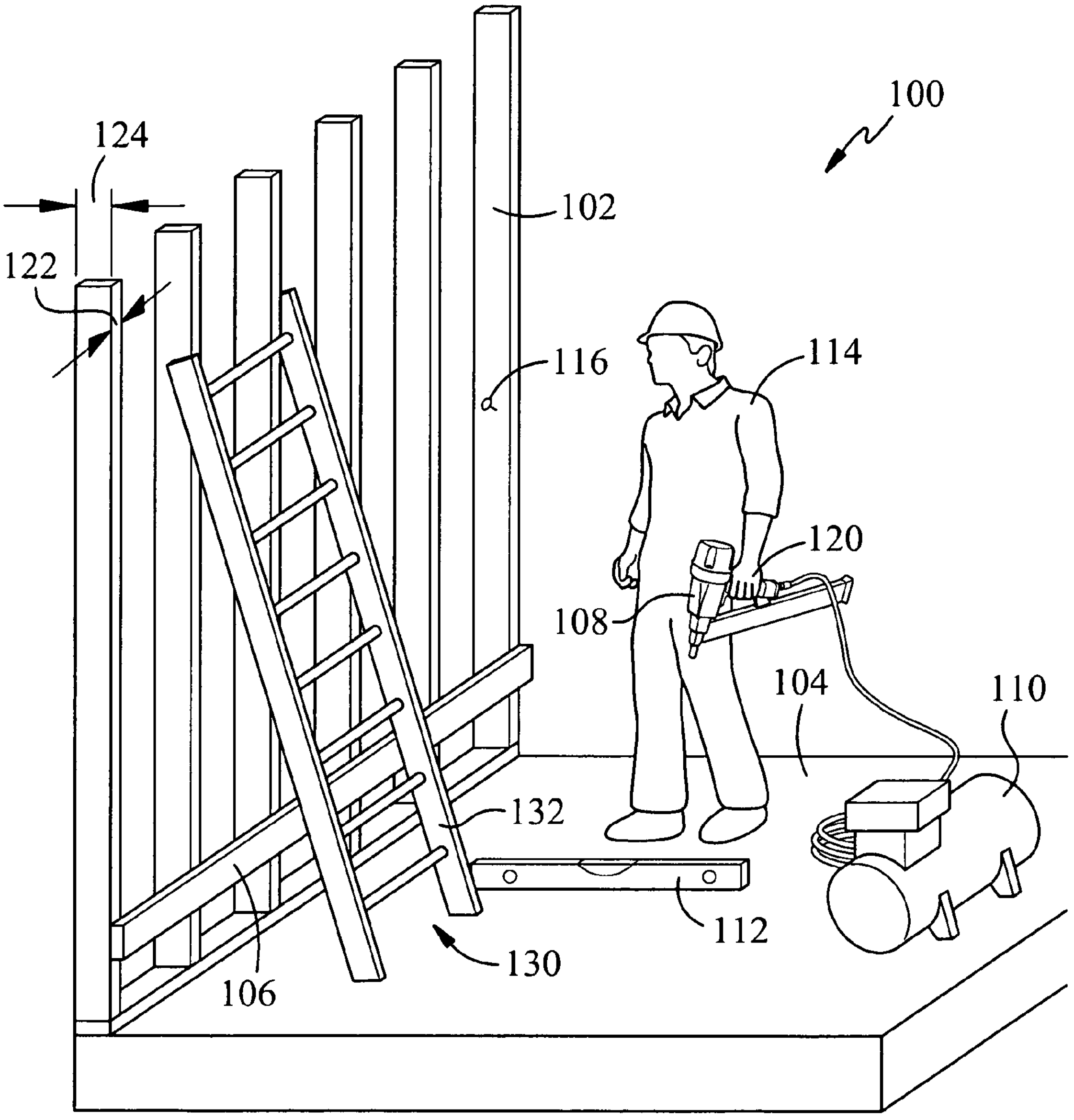
FIG. 1 (Prior Art)
FIG. 1 is a schematic illustration of a prior art work site that includes exposed studs.

FIG. 1 shows an example of a worksite 100 associated with construction of a building. A workman 114 in the process of attaching a crosspiece 106 to a set of members or studs 102 must check for the level of the crosspiece 106. This requires that the workman 114 put down the tool or nail gun 108 that he had been using to attach the cross piece 106 and to pick up a level 112 currently lying on the floor 104. Because of the danger of leaving the nail gun 108 unattended, a workman 114 drives a nail 116 into one of the studs 102 and hangs the nail gun 108 on it prior to using the level 112. Upon completion of the alignment measurement, the workman 114 removes the nail gun 108 from the nail 116 and, subsequently, remove the nail 116. As leveling measurements must be done regularly during construction, the workman 114 often finds that he has to repeatedly attach a nail 116 to a stud 102, hang the nail gun 108, and then detach the hanging nail gun 108 from the stud 102 and remove the nail 116, diverting his attention from the task at hand and consuming significant time and effort.

Figure 2:
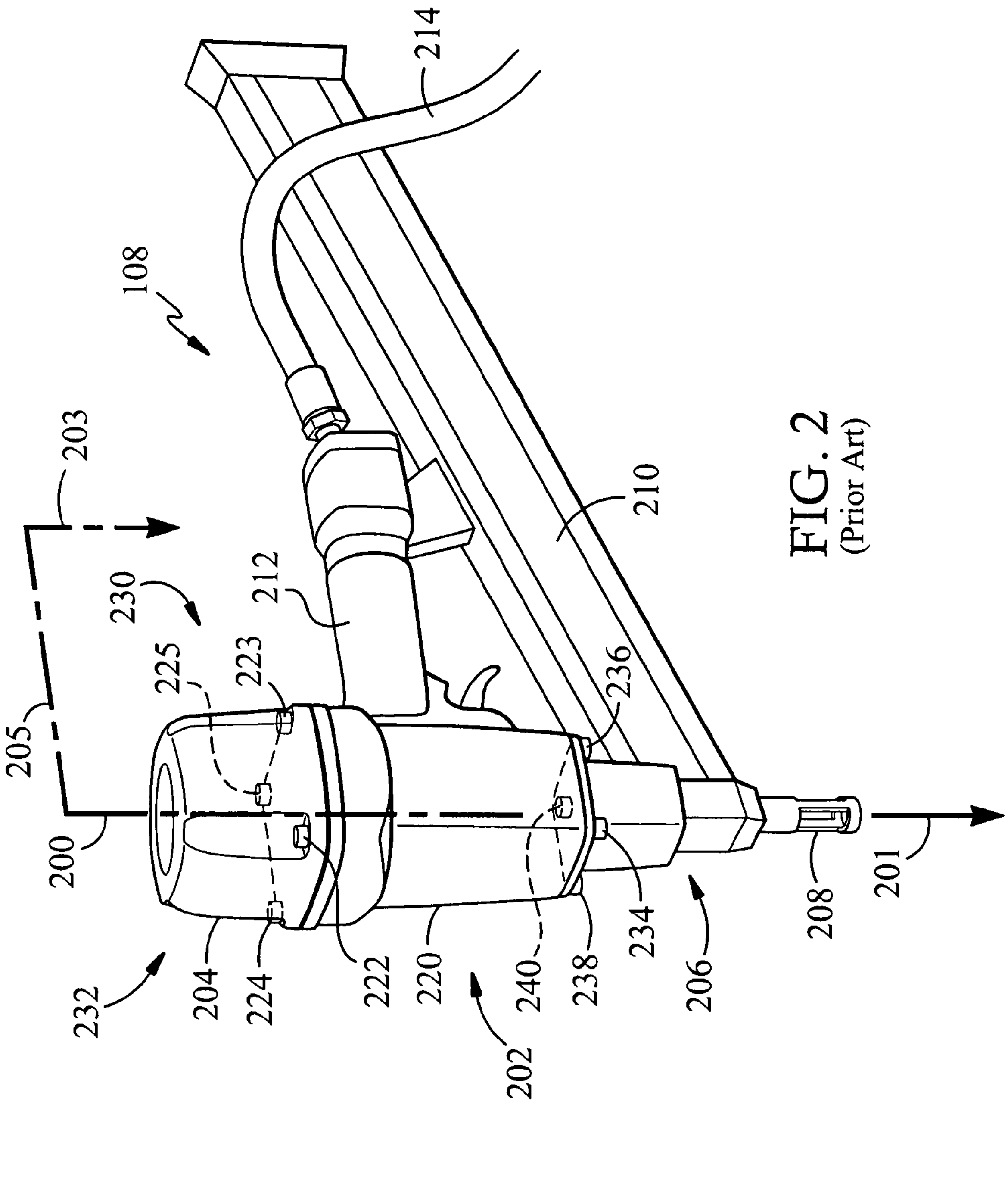
FIG. 2 (Prior Art)
FIG. 2 is a pictorial illustration of a prior art nail gun.

A typical tool 108 is a conventional pneumatically powered framing nail gun 108, shown in FIG. 2. The weight of the body 202 of the nail gun 108 is represented by an arrow 201 along a longitudinal axis 200 of the body 202 and the combined weights of a handle 212, a nail magazine 210, and a pneumatic hose 214, acting at arm 205, are all represented by an arrow 203. Most, if not all power tools, whether electric or pneumatically powered, have a handle 212 that extends transverse to the body 202.

The body 202 of the nail gun 108 shown usually includes a center body 220, a rear cap 204, a front drive 206, and a nail set 208 distributed substantially symmetrically about the longitudinal axis 200 of the body 202. The rear cap 204 is secured to the center body 220 by two accessible machine screws or couplers on each side of the nail gun 108. On the left side 230 (viewed from above the nail gun 108), they are screws 222 and 223, while on the right side 232 (viewed from above the nail gun 108), they are screws 224 and 225. The front drive 206 is also secured to the center body 220 by two accessible machine screws or couplers on each side of a nail gun 108. On the left side 230, they are screws 234 and 236, as shown, while on the right side, they are screws 238 and 240.

Figure 3A:
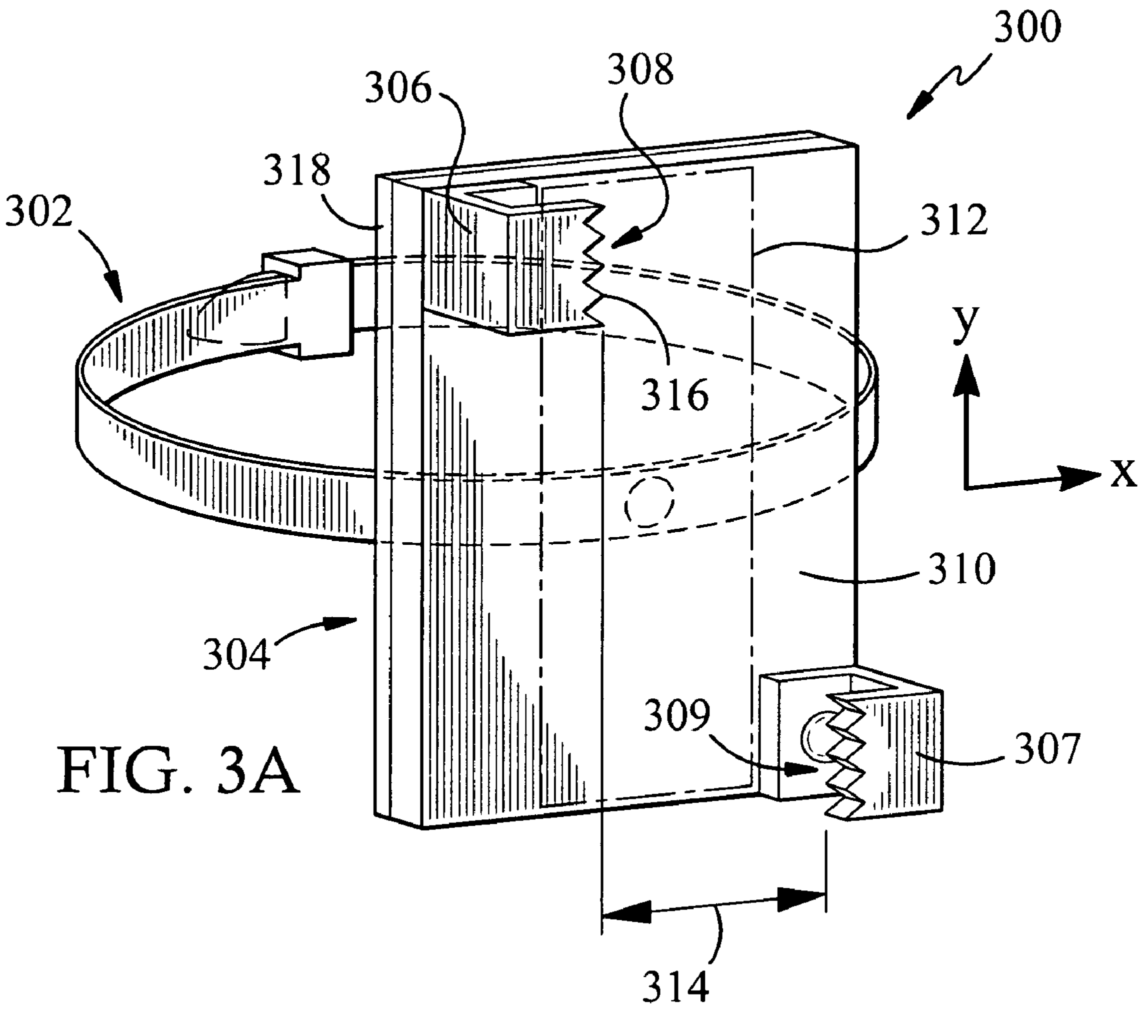
FIG. 3A is a pictorial front view illustration of a tool mounting device according to an embodiment of the present invention, including a tool fastening element and a member securing element.
Figure 3B:
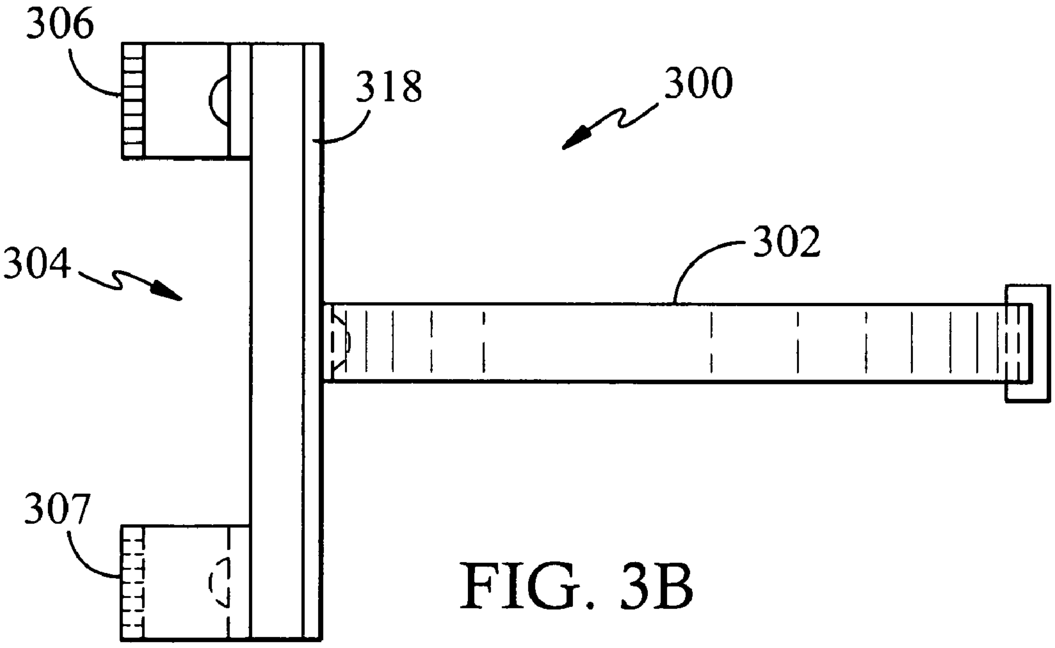
FIG. 3B is a pictorial side view illustration of a tool mounting device according to an embodiment of the present invention, including a tool fastening element and a member securing element.

FIG. 3A shows a front view and FIG. 3B shows a side view of a tool mounting device 300 according to one embodiment of the present invention used to attach to the nail gun 108 of FIG. 2. The tool mounting device 300 includes a tool-fastening element 302 and a member securing element 304. The tool fastening element 302 attaches to the center body 220 of the nail gun 108. As shown in FIGS. 3A and 3B, the tool fastening element 302 is in the form of, for example, a pipe cinching device. The tool fastening element 302 may be of various configurations and is not mean to limit the invention. In other embodiments according to the present invention, the tool fastening element 302 may be a resilient strap, a non-resilient strap, a magnetic fastener, etc. Attached to or integral with the tool fastening element 302 is the member securing element 304. Attached to or integral with the member securing element 304 are an upper gripping surface 308 and a lower gripping surface 309. The upper gripping surface 308 may be part of an upper gripper 306 and the lower gripping surface may be part of a lower gripper 307. The upper gripper 306 and the lower gripper 307 may be integral with or attached to a base plate 310.

As shown in FIGS. 3A and 3B, the upper gripping surface 308 and the lower gripping surface 309 are displaced laterally from each other in the x direction and also longitudinally from each other in the y direction to create a space 312 between them. The lateral separation 314 between the upper 308 and lower 309 gripping surfaces is sufficiently large to more than span the member width 122 and/or the member depth 124 (FIG. 1) of the typical member 102 to which the tool mounting device 300 is to be attached. For a nail gun 108 typically used in home construction, where members may be 2"×4" upright or substantially vertical studs, a lateral separation 314 of greater than 4" permits attachment of the tool mounting device 300 to the stud 102 either by its width 122 or by its depth 124. The lateral separation 314 is not limited to facilitating attachment to 2"×4" substantially vertical studs, but may sufficiently wide to allow attachment of the tool mounting device 300 to a range of member dimensions and shapes. Further, the lateral separation 314 may be adjustable by the workman 114 so as to permit attachment of a tool such as a nail gun 108 to members 102 having a greater range of dimensions and other shapes.

The upper 306 and lower 307 grippers may be integral with the base plate 310 of the member securing element 304 or they may be attached to the base plate 310 of the member securing element 304 in a fixed or and adjustable manner. The upper 308 and lower 309 gripping surfaces may be a single projection or point 316, a series of interconnected projections or points 316, a roughened surface, or some other surface resistant to slippage when in contact with the member 102. The member securing element 304 may also comprise a slip resistant surface 318 (FIG. 3B), such as, but not limited to, Velcro®, that minimizes slippage between the member securing element 304 and the tool 108.

Figure 4:
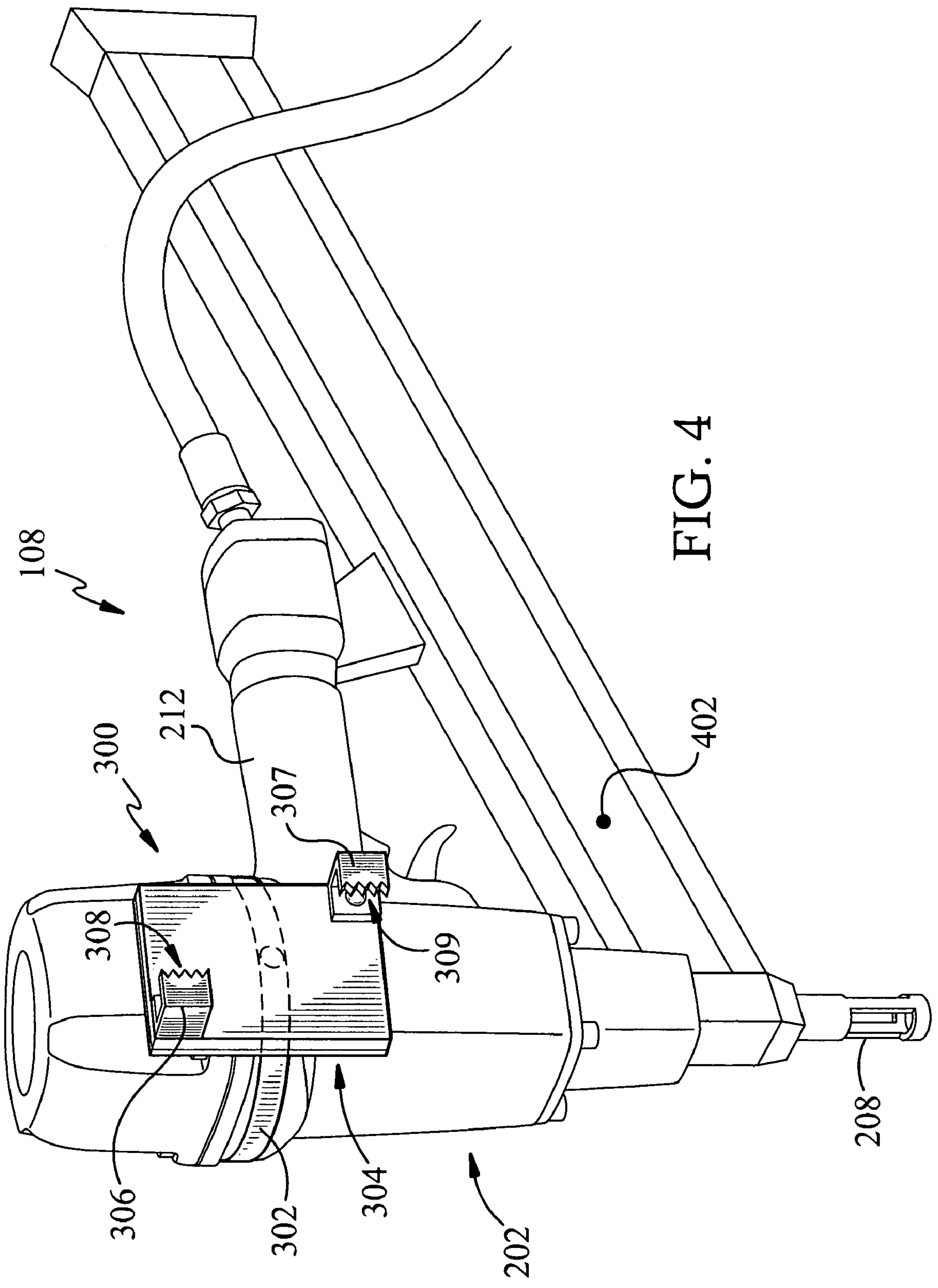
FIG. 4 is a pictorial illustration of a combination of a nail gun and a tool mounting device according to an embodiment of the present invention.

FIG. 4 illustrates the attachment of the tool mounting device 300 to the nail gun 108. The tool fastening element 302 encircles the body 202 of the nail gun 108 and is secured by tightening of the tool fastening element 302. The member securing element 304 is oriented such that the lower gripping surface 309, that is the gripping surface closest to the nail set 208, is also the gripping surface closest to the handle 212. The ease of attachment of the tool fastening element 302 allows the tool mounting device 300 to be conveniently and rapidly installed prior to work and then removed at the completion of the day.

The nail gun 108 is only one type of tool that may be supported by embodiments of the present invention. The only stipulation is that the tool mounting device 300 be mountable on the tool 108 at a location such that the center of gravity 402 of the tool lies outside the space 312 between the gripping surfaces 308 and 309 and substantially within a plane of the space 312 containing the gripping surfaces 308 and 309. Thus, nail gun and tool will be used interchangeably in the description of the present invention.

Figure 5:
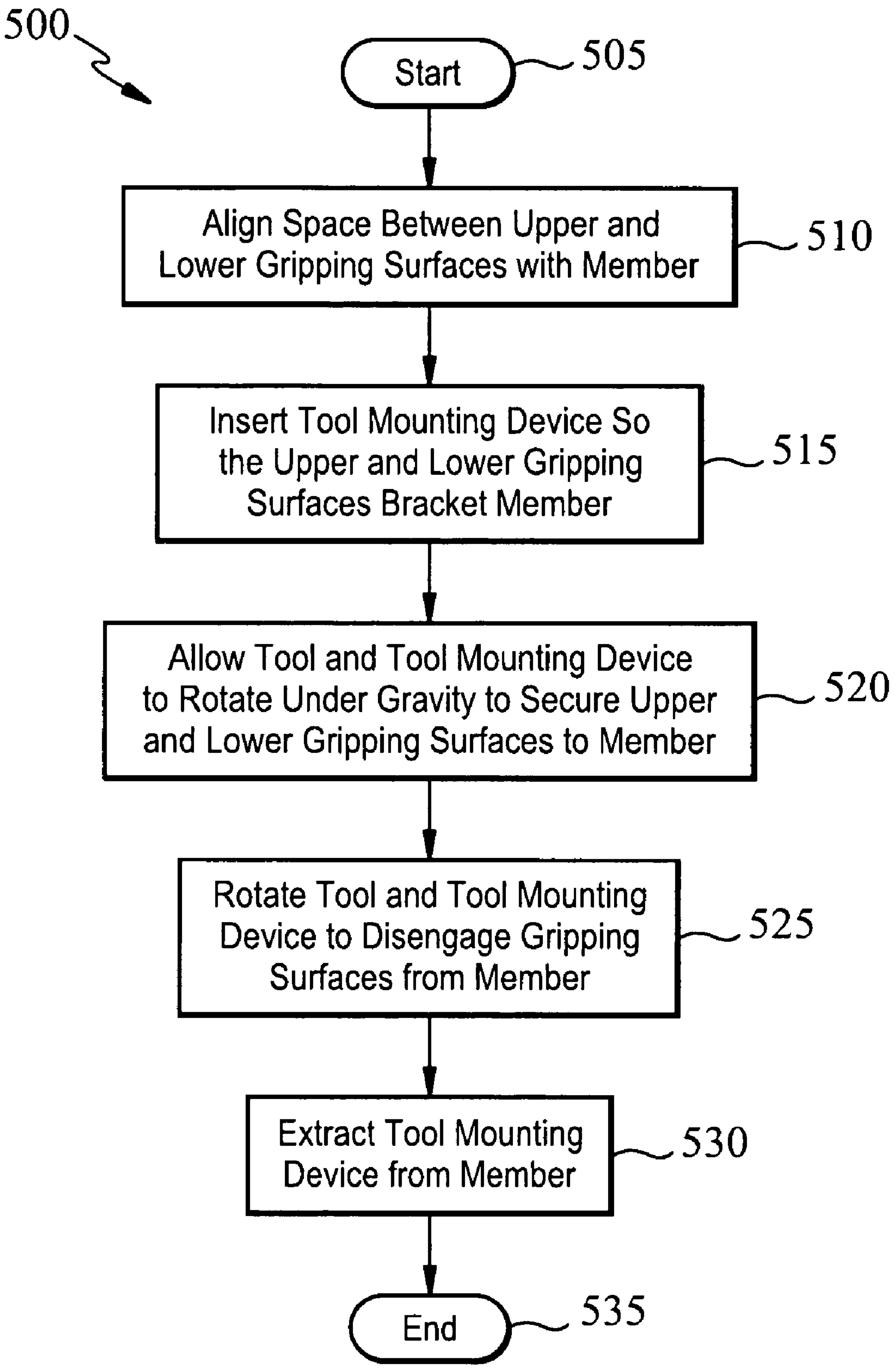
FIG. 5 is a flow chart illustrating a method according to an embodiment of the present invention for securing a nail gun to a stud with a tool mounting device.
Figure 6A:
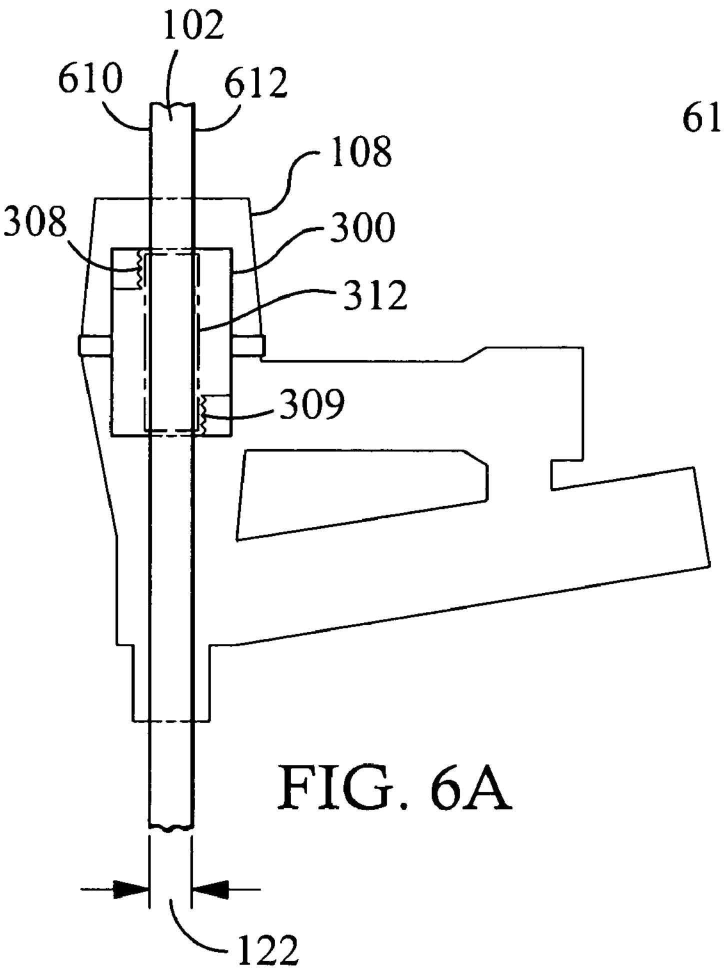
FIG. 6A is a schematic side view illustration of an initial presentation of a combination nail gun and tool mounting device to a stud according to an embodiment of the present invention.
Figure 6B:
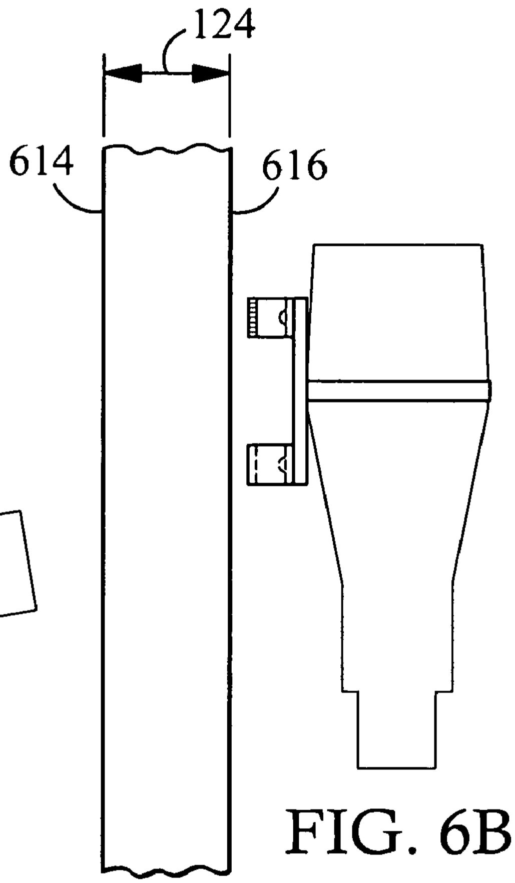
FIG. 6B is a schematic front view illustration of an initial presentation of a combination nail gun and tool mounting device to a stud according to an embodiment of the present invention.
Figure 7A:
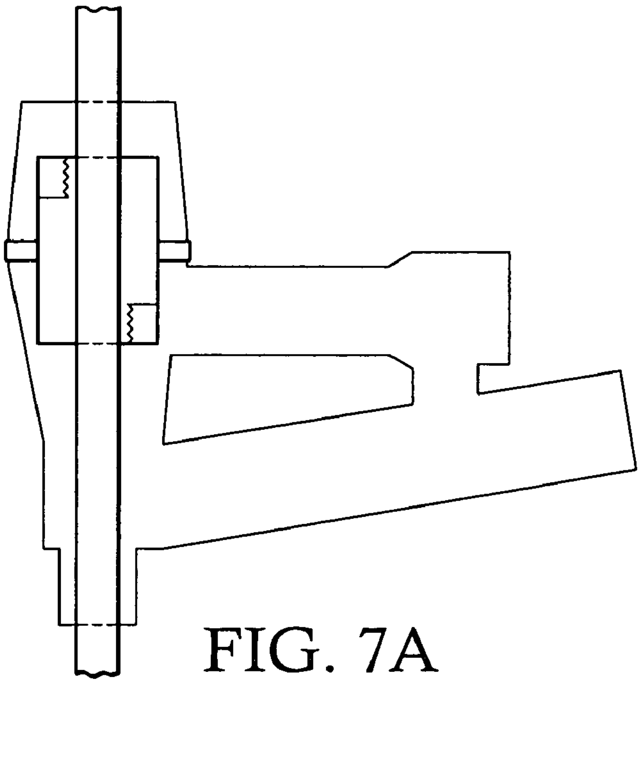
FIG. 7A is a schematic side view illustration of the insertion of the tool mounting device against the stud according to an embodiment of the present invention.
Figure 7B:
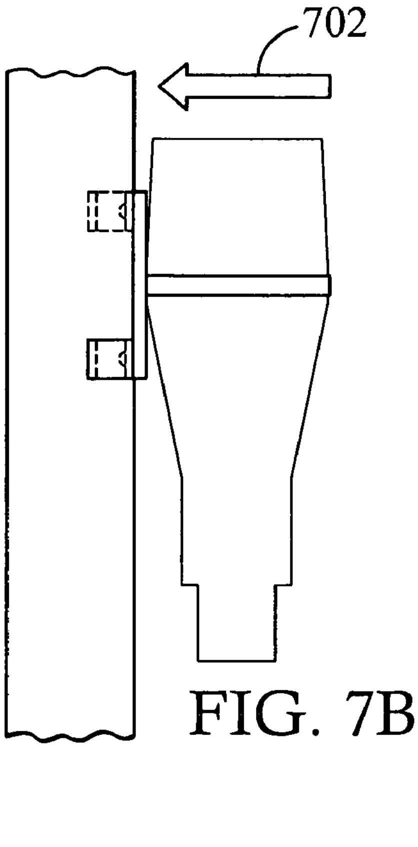
FIG. 7B is a schematic front view illustration of the insertion of the tool mounting device against the stud according to an embodiment of the present invention.
Figure 8A:
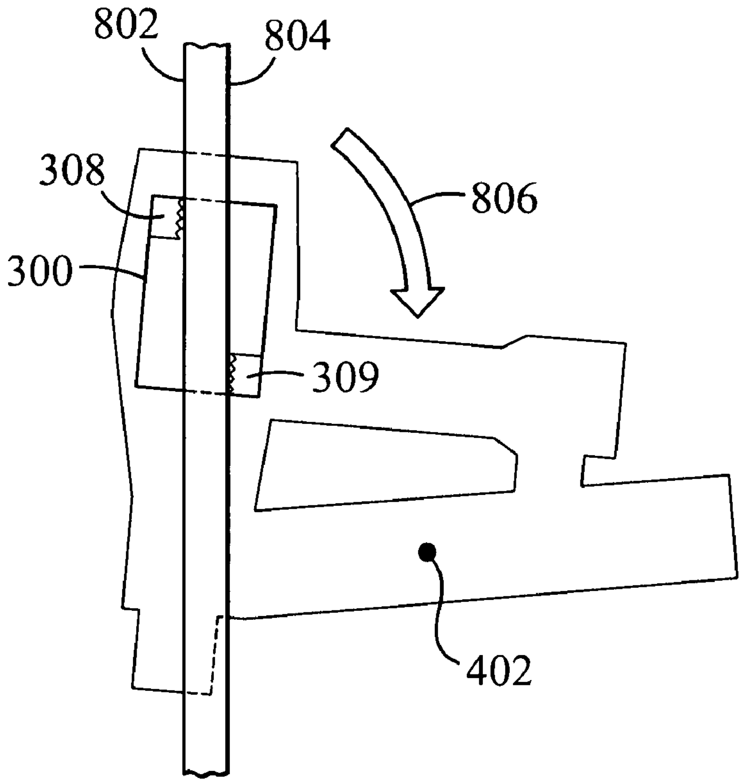
FIG. 8A is a schematic side view illustration of the engagement of a member securing element of the tool mounting device with sides of the stud according to an embodiment of the present invention.
Figure 8B:
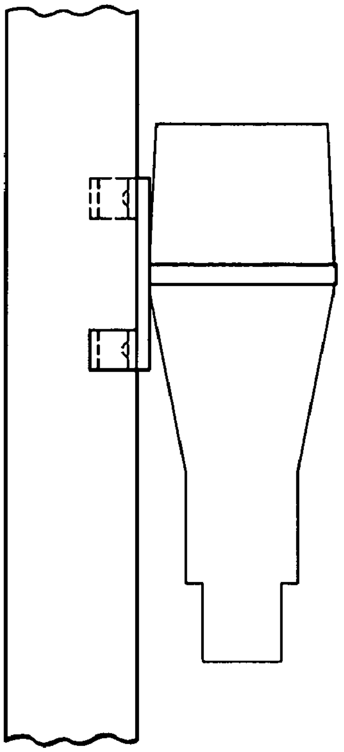
FIG. 8B is a schematic front view illustration of the engagement of a member securing element of the tool mounting device with sides of the stud according to an embodiment of the present invention.
Figure 9A:
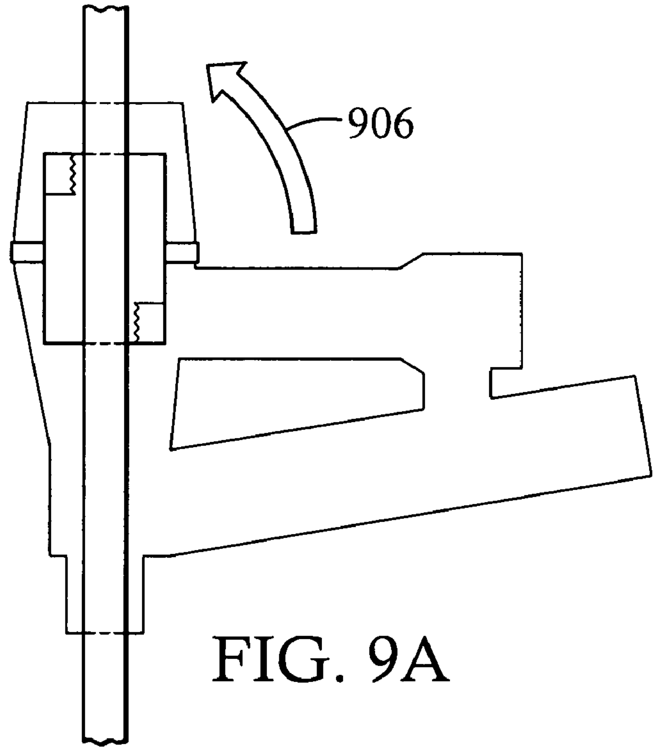
FIG. 9A is a schematic side view illustration of disengagement of a member securing element of the tool mounting device from the sides of the stud according to an embodiment of the present invention.
Figure 9B:
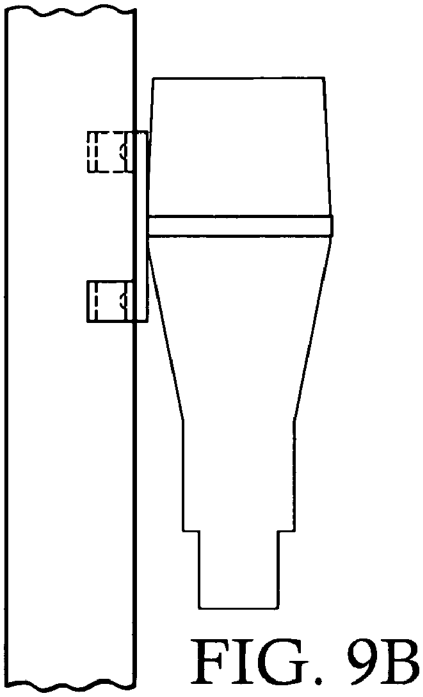
FIG. 9B is a schematic front view illustration of disengagement of a member securing element of the tool mounting device from the sides of the stud according to an embodiment of the present invention.
Figure 10A:
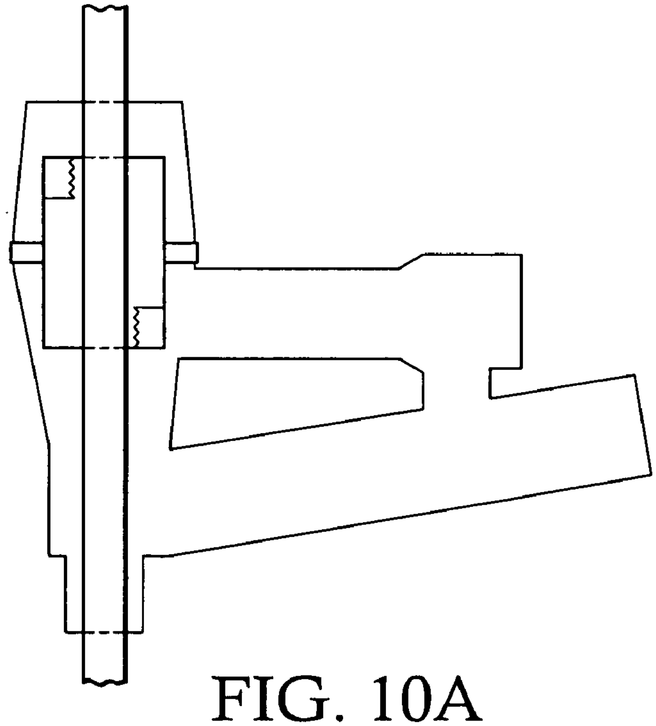
FIG. 10A is a schematic side view illustration of removal of the tool mounting device from the stud according to an embodiment of the present invention.
Figure 10B:
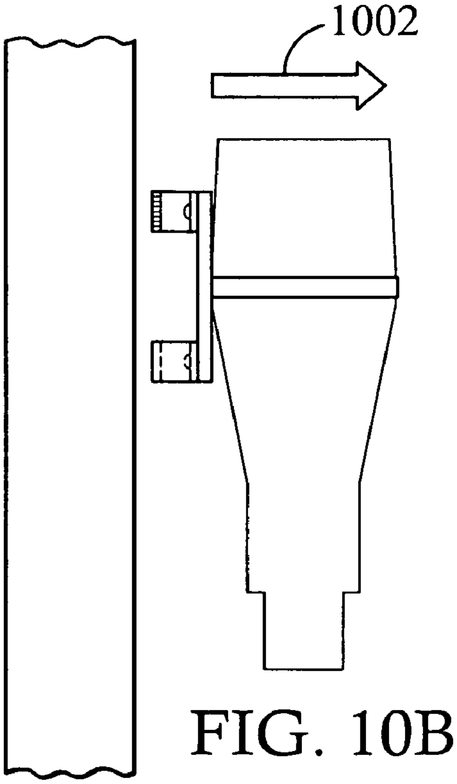
FIG. 10B is a schematic front view illustration of removal of the tool mounting device from the stud according to an embodiment of the present invention.

FIG. 5 in conjunction with FIGS. 6-10 illustrates a method 500 according to an embodiment of the present invention for mounting a tool such as a nail gun 108 to a substantially upright member such as a substantially vertical stud 102. In step 510, the space 312 between the upper 308 and the lower 309 gripping surface is aligned with the member 102 to which the nail gun 108 is to be mounted. (See FIG. 6A for a side view and FIG. 6B for a front view.) The nail gun 108 is brought into the vicinity of the stud 102 and aligned with the stud 102, such that the upper 308 and the lower 309 gripping surfaces lie to either side of a width 122, in this case, or a depth 124, of the stud 102. In step 515, the tool mounting device 300 is inserted or placed (arrow 702) from front side 616 of stud 102 against the stud 102 in a direction substantially perpendicular to the front side 616 of the stud 102 such that the lower 309 and upper 308 gripping surfaces bracket the member 102, that is, lie to either side of the width 122 of the stud 102 and such that tool mounting device 300 does not obstruct the opposite side or back side 614 of the member 102. (See FIG. 7A for a side view and FIG. 7B a front view.) Up to this point, the workman 114 holds the tool or nail gun 108 with a single hand.

In step 520, the workman 114 allows the tool, in this case, the nail gun 108, and the attached tool mounting device 300 to rotate under gravity. As a result of the rotation, the upper gripping surface 308 secures itself to a lateral side or left side 802 of the member 102 and the lower gripping surface 309 secures itself to an opposite lateral side or right side 804 of the member 102, where the left side 802 and the right side 804 are substantially perpendicular to the front side 616 and the opposite, or back, side 614 of the member.

As a result of the combined weight of the handle 212, the nail magazine 210, and the hose 214 and their displacement from the axis of the tool body 201 (FIG. 2), a center of gravity 402 (FIG. 4) of the nail gun 108 is not along the axis 201 of the body 202 of the nail gun 108. Consequently, the center of gravity 402 is also displaced from the location of the tool mounting device 300. As a result, when the workman 114 allows the nail gun 108 to rotate 806, the displaced center of gravity of the nail gun 108 causes the nail gun 108 to rotate. As a result, the lower gripping surface 309 is driven into or engages one side 804 of the stud 102, and the upper gripping surface 308 engages the opposite side 802 of the stud 102. Once the upper 308 and lower 309 gripping surfaces have engaged the stud 102, the tool or nail gun 108 is securely held in place by the action of its displaced or offset center of gravity 402, thereby cantilevering the nail gun 108 to the side 804 of the member 102 containing the center of gravity 402. The workman 114 may withdraw his support for the nail gun 108 and leave the nail gun 108 to hang on its own.

When the workman 114 wishes to resume using the nail gun 108, he may reach for the nail gun 108 and counter-rotate or counter-position 906 the tool or nail gun 108 and the tool mounting device 300 in a direction opposite to the prior rotation to disengage the upper 308 and the lower 309 gripping surfaces of the member securing element 304 from the stud 102. (Step 525 and FIG. 9A and FIG. 9B), Upon disengagement of the upper 308 and the lower 309 gripping surfaces from the stud 102, the workman 114 may remove or extract the nail gun 108 and resume work by extracting 1002 the tool mounting device 300 from the stud 102 or member in a direction substantially perpendicular to the member 102. (Step 530 and in FIGS. 10A and 10B.)

Thus, when the nail gun 108 or another tool is held by the tool mounting device 300 attached to the tool body 202 and engaging a substantially vertical or upright member such as a stud 102, the nail gun 108 is held cantilevered to one side 804 of the member 102. The cantilevering force presses the upper gripping surface 308 against one face or side 802 of the member 102, while pressing the lower gripping surface 309 against the opposite face or side 804 of the member. Consequently, the upper 308 and lower 309 gripping surfaces of the tool mounting device 300 grip the stud 102 by the force generated by the weight of the tool 108, or, in this case, more particularly, because of the off-set center of gravity 402 of the tool 108. The tool or nail gun 108 is held securely on the stud 102 until the workman 114 rotates and lifts the tool 108 from the stud 102. Of course, any upright board or portion of a board in an upright position at the worksite 100 to which the member securing element 304 may fasten and fit may be used to hold the tool 108. The workman 114 may place the tool 108 there with one hand and, an similarly, remove the tool 108 with one hand. Other structures at the worksite may also be used and include stiles 132 of a ladder 130 (FIG. 1).

Figure 11:
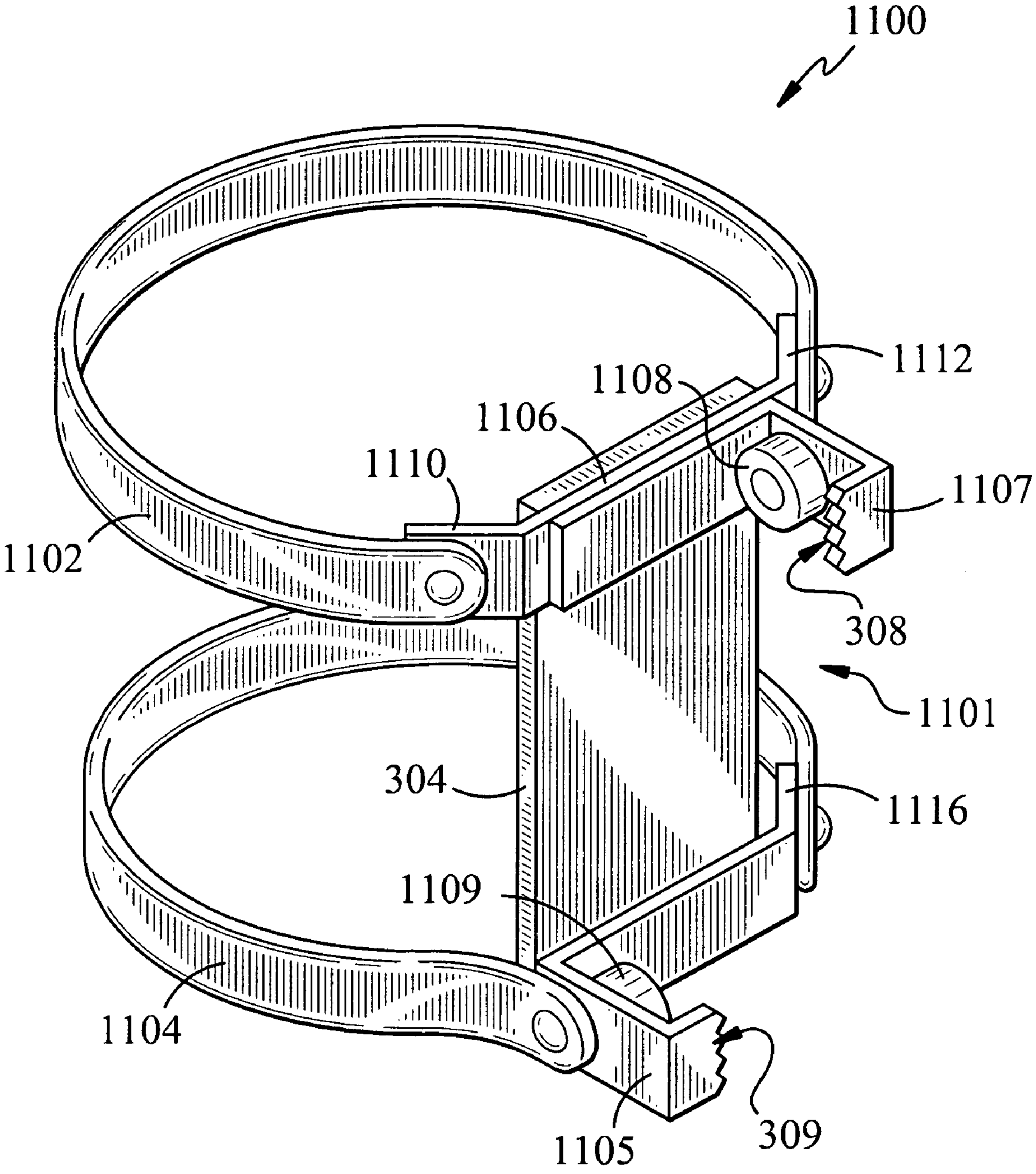
FIG. 11 is a pictorial illustration of a tool mounting device according to an embodiment of the present invention, which includes resilient straps as tool fastening elements.

FIG. 11 illustrates a tool mounting device 1100 corresponding to another embodiment of the present invention. Upper 1102 and lower 1104 resilient bands, which may be elastic, are coupled to a member-securing element 1101. Upper 1107 and lower 1105 grippers are attached to the member-securing element 1101. Upper gripping surface 308 and lower gripping surface 309 have toothed edges to enable gripping of the stud or member 102. An aligner 1106 forms part of the member securing element 1101. The aligner 1106 includes an upper bent left section 1110 and an upper bent right section 1112 that permit wrapping of the member securing element 1101 about the tool body 202 (FIG. 2), thereby more securely holding the member securing element 1101 to the tool or nail gun 108. The lower gripper 1105 has a lower bent right section 1116 to similarly enhance holding of the member securing element 1101 to the nail gun 108. Upper 1108 and lower 1109 rubber disks are mounted on the upper 1107 and lower 1105 gripper, respectively, to enhance the maintenance of position of the member-securing element 1101 relative to the member 102.

Figure 12B:
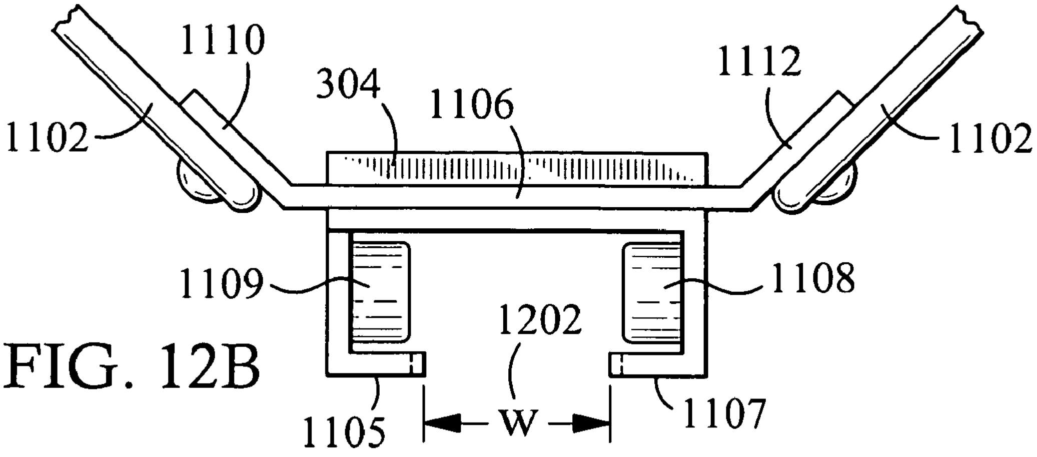
FIG. 12B is a schematic top view illustration of the member securing element of the tool mounting device of FIG. 11.
Figure 12A:
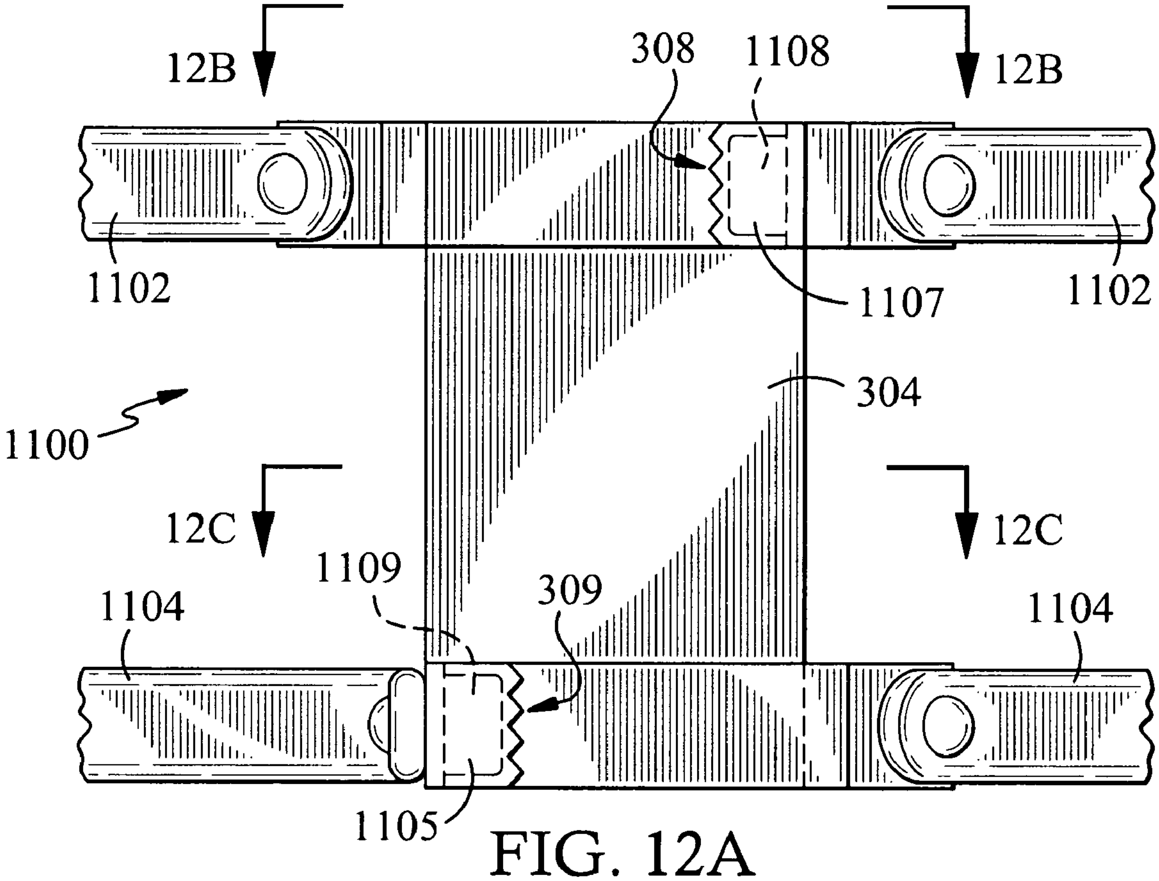
FIG. 12A is a schematic front view illustration of the member securing element of the tool mounting device of FIG. 11.
Figure 12C:
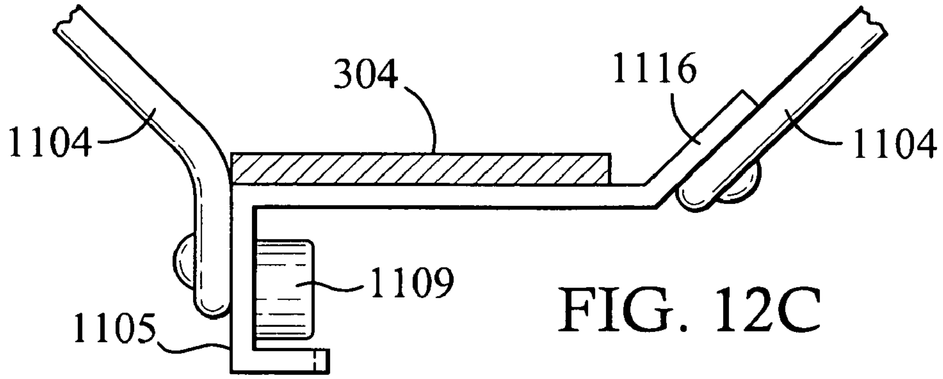
FIG. 12C is a schematic cross-sectional view illustration of the member securing element of the tool mounting device of FIG. 11.

FIG. 12A, FIG. 12B and FIG. 12C illustrate the tool mounting device 1100 from a front, top and a middle cross-section perspective, respectively. The width w 1202 between the lateral positions of the upper 308 and lower 309 gripping surfaces allows for insertion of a 2" by 4" or a 2" by 6" board or stud 102.

Figure 13:
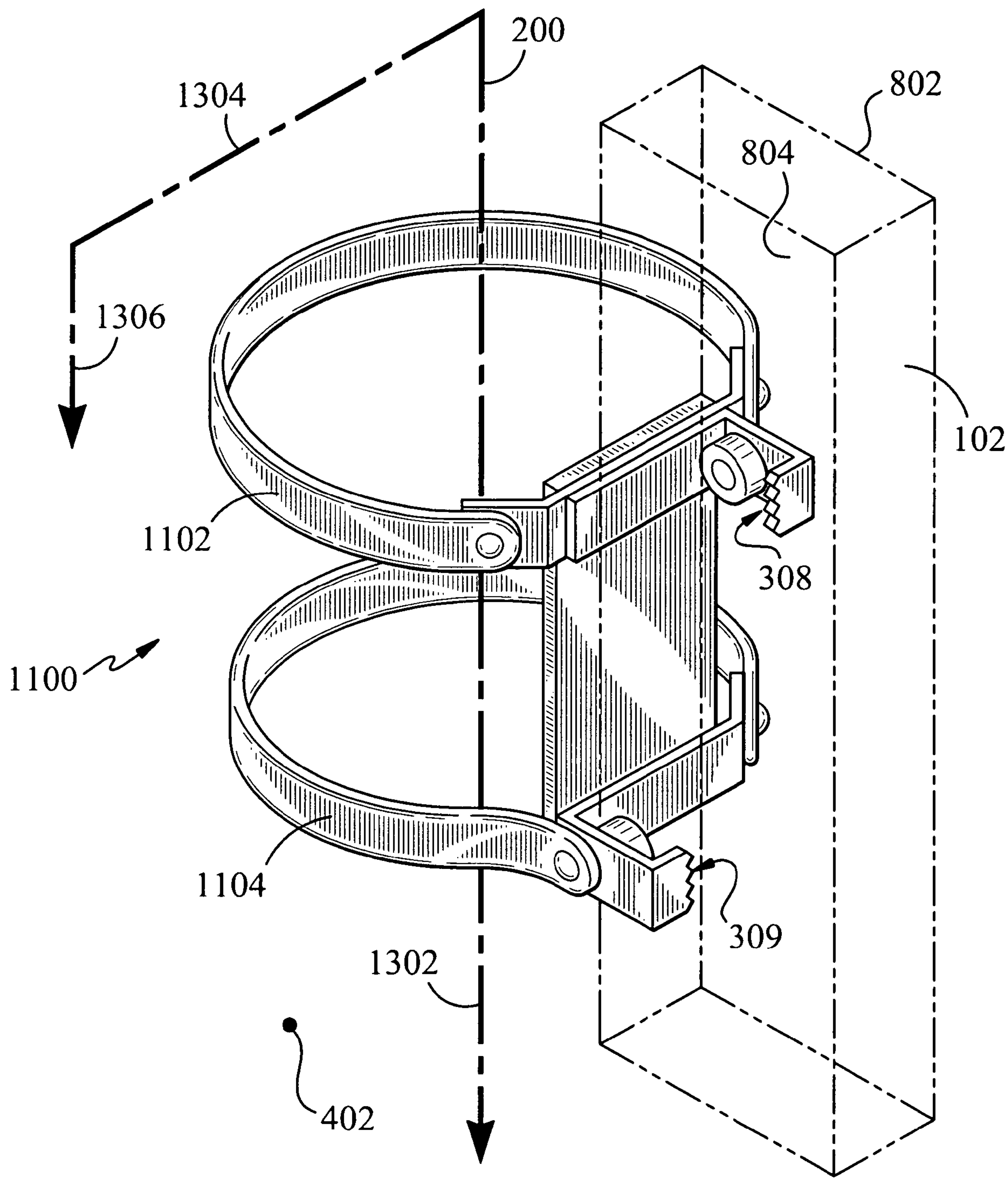
FIG. 13 is a pictorial illustration of the tool mounting device of FIG. 11, engaging a stud.

In FIG. 13, the weight of the body 202 of the tool or nail gun 108 is represented by arrow 1302 along the axis 200 of the nail gun 108 (FIG. 2). The member securing element 1101 is attached to the body 202 by upper 1102 and lower 1104 resilient bands. Most, if not all, power tools whether electric or pneumatic powered have a handle 212 that extends transverse to the body 202. In FIG. 13, the handle 212 is represented by an arm 1304 and the weight of the handle 212, the nail tray or magazine 210, and the hose 214 is represented by arrow 1306. As in the embodiment of FIG. 4, the center of gravity 402 of the tool 108 lies on the same side as the lower gripping surface 309. Consequently, insertion of the member securing element 1101 onto the stud 102 and release of the member securing element 1101 results in rotation of the tool mounting device 1100 as well as the nail gun 108 in such a way as to drive the lower gripping surface 309 as well as the upper gripping surface 308 into the stud 102. Thus, the tool is held by the tool mounting device 1100 cantilevered to one side of the stud 102.

The cantilevering force presses the upper gripping surface 308 against one face 802 of stud 102 while pressing the lower gripping surface 309 against the opposite face 804 of stud 102. The member securing element 1101 grips the stud 102 by the force generated by the weight of the tool 108. The tool 108 is securely held on the stud 102 until the workman 114 lifts the tool 108 from the stud 102.

Figure 14:
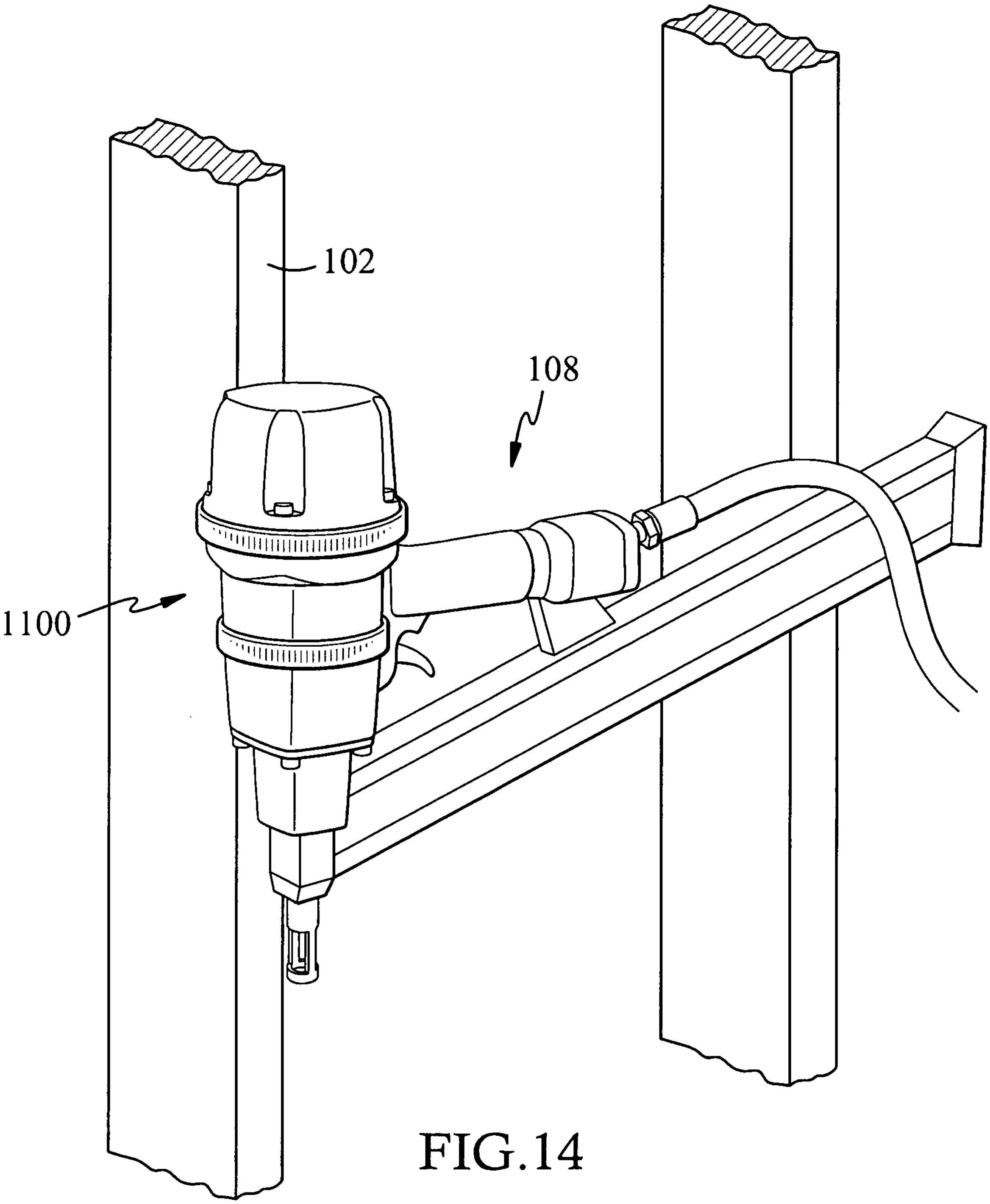
FIG. 14 is a pictorial illustration of a conventional pneumatic nail gun, with the tool mounting device of FIG. 111 attached, hung to a stud.

Any upright or substantially vertical board or other part at the work site 100 onto which the member securing element 1101 may fit may be used by the workman 114 to hold his tool 108. The workman 114 can place the tool 108 on the member 102 with one hand 120 and remove it with one hand 120. Also, other structures at the work site 100 which may be used include stiles of a ladder. FIG. 14 illustrates a nail gun 108 held to a stud 102 by tool mounting device 1100.

Figure 15:
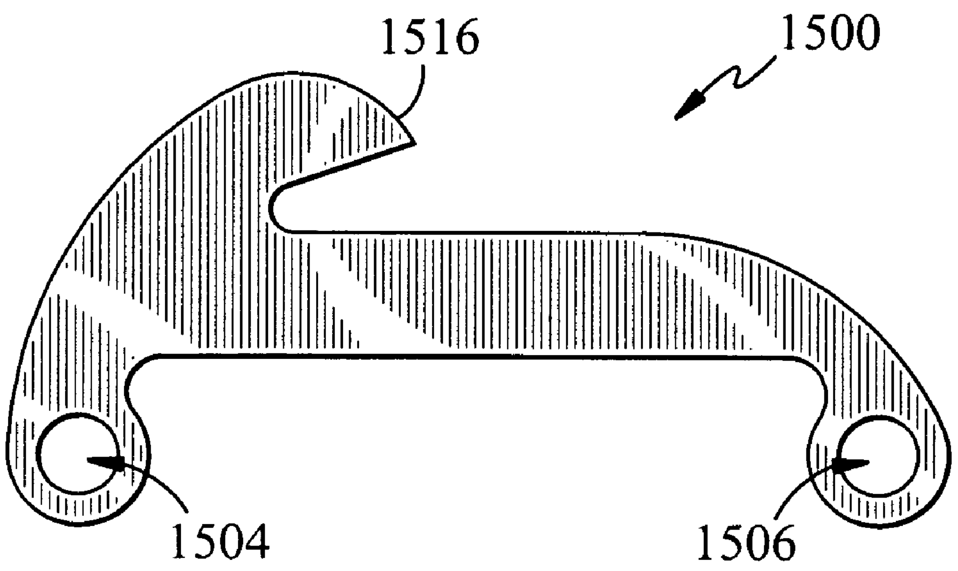
FIG. 15 is a schematic top view illustration of an upper member securing element for direct attachment to a tool, according to an embodiment of the present invention.
Figure 16:
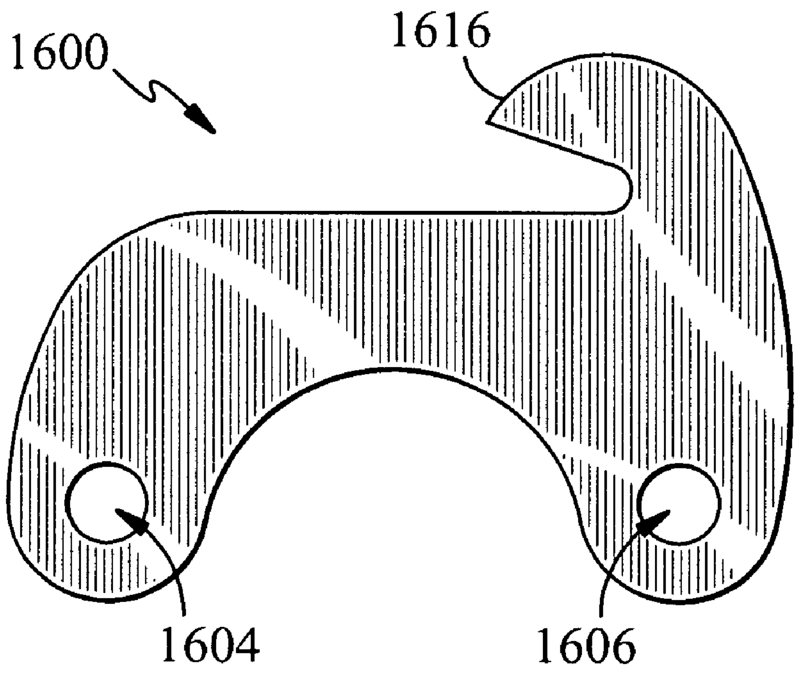
FIG. 16 is a schematic top view illustration of a lower member securing element for direct attachment to a tool, according to an embodiment of the present invention.
Figure 17:
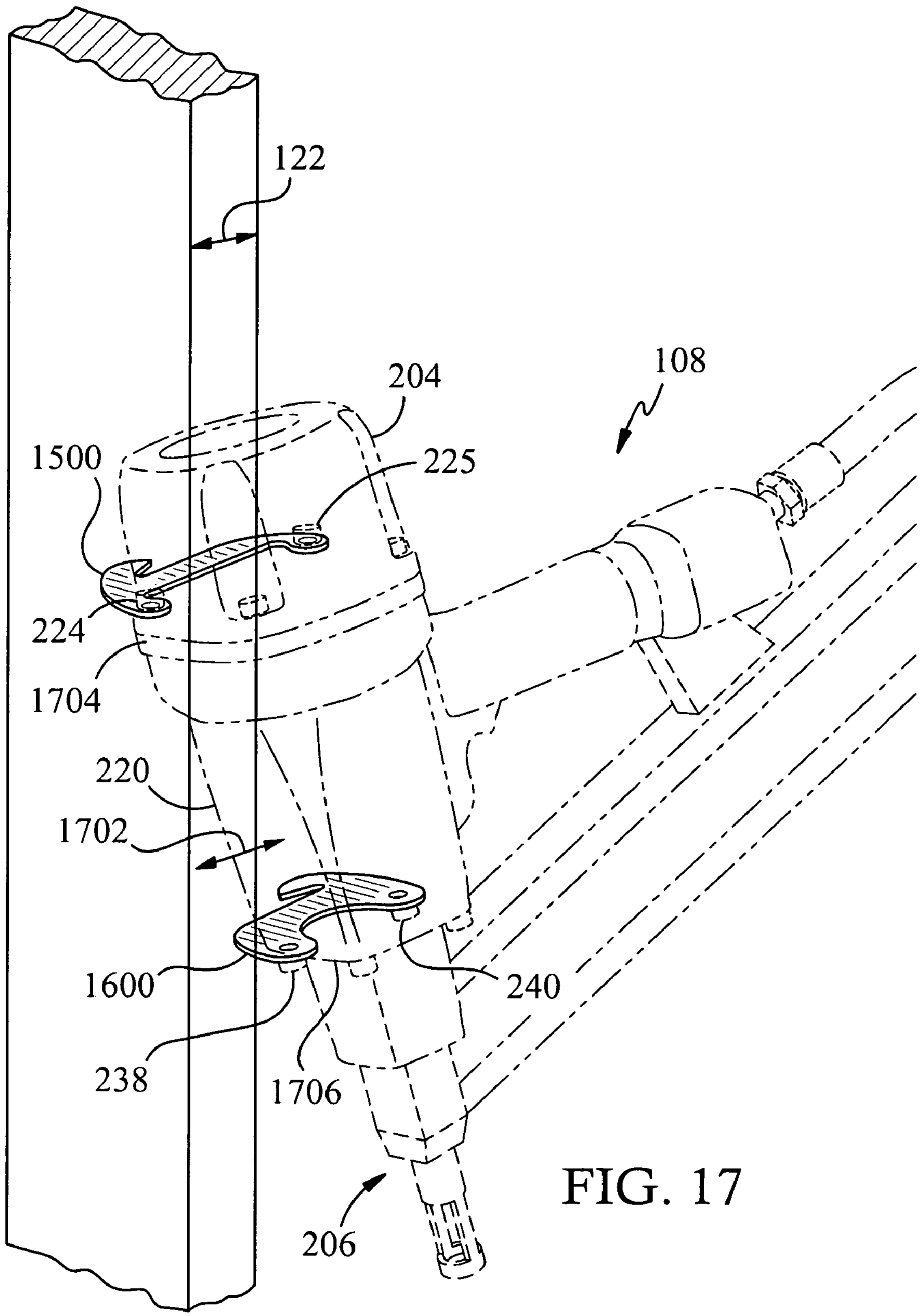
FIG. 17 is a pictorial illustration of a tool with the upper member securing element of FIG. 15 and the lower member securing element of FIG. 16 directly attached to the tool and engaging the stud, according to an embodiment of the present invention.

FIG. 15 and FIG. 16 are top views of an upper 1500 and a lower 1600 direct member securing elements, respectively, for attachment to accessible screws or couplers on the side of a tool 108 such as the typical pneumatically powered nailing gun 108 of FIG. 2. Upper 1500 and the lower 1600 direct member securing elements may be made from, but not limited to, rigid flat stock of metal or plastic. Upper direct member securing element 1500 is shown as top view as it would be attached to upper portion 1704 of center body 220 by screws 224 and 225 to the right side of the gun as shown in FIG. 17. Lower direct member securing element 1600 is also shown as top view as it would be attached to lower portion 1706 of center body 220 by screws 238 and 240 to the right side of the gun as shown in FIG. 17.

Upper direct member securing element 1500 includes upper projection or point 1516 and clearance holes 1504 and 1506 for screws 224 and 225. Lower direct member securing element 1600 includes lower projection or point 1616 and clearance holes 1604 and 1606 for screws 238 and 240

FIG. 17 illustrates an embodiment of the present invention where the upper direct member securing element 1500 and the lower direct member securing element 1600 are attached to the nail gun 108 using screws or couplers and screw sites already present in the nail gun 108 for attachment of its rear cap 204 to its center body 220 and of its front drive 206 to its center body 220 or couplers of greater length. As shown in FIG. 17, the width 1702 of the space between the upper 1516 and lower 1616 projections upon mounting of the upper 1500 and lower 1600 direct member securing elements to the tool 108 is sufficiently wide for the width 122 of a stud 102 to fit between them and, when the nail gun 108 is allowed to rotate, to secure the nail gun 108 in a cantilevered position relative to the stud 102.

Figure 18A:
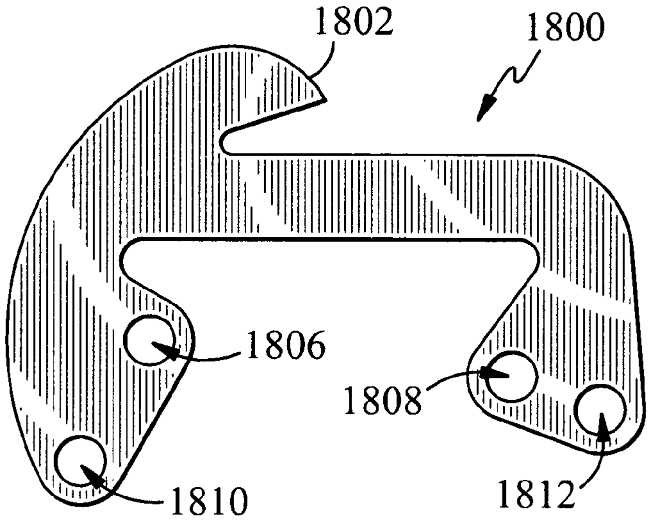
FIG. 18A is a schematic top view illustration of an interchangeable member securing element for direct attachment to a tool, according to an embodiment of the present invention, including two sets of holes, one accommodating the upper screws of the tool and the other accommodating the lower screws of the tool.
Figure 18B:
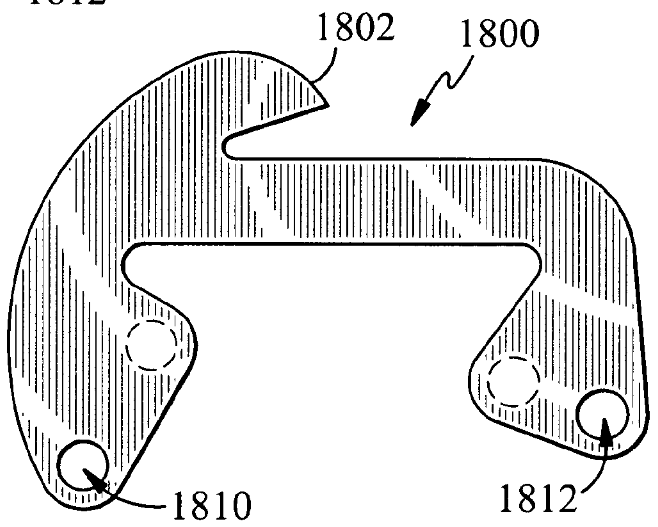
FIG. 18B is a schematic top view illustration of the interchangeable member securing element of FIG. 18A for direct attachment to one set of accommodating upper screws of a tool with the set of holes not used shown by a broken line.
Figure 18C:
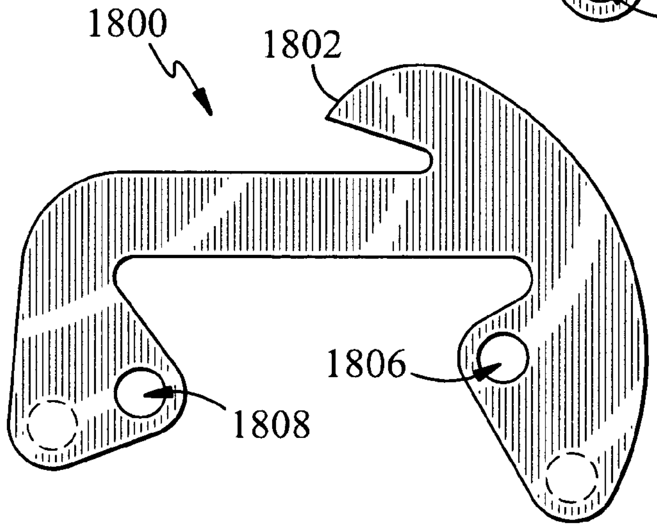
FIG. 18C is a schematic top view illustration of the interchangeable member securing element of FIG. 18A for direct attachment to one set of accommodating lower screws of a tool with the set of holes not used shown by a broken line.

FIG. 18A, FIG. 18B, and FIG. 18C illustrate an embodiment of the present invention where there is an interchangeable direct member securing element 1800, designed for attachment, both in an upper and in a lower position, to the nail gun 108. The interchangeable direct member securing element 1800 includes a projection 1802 for gripping the stud 102 and two sets of holes. Holes 1806 and 1808 are for attachment of the interchangeable direct member securing element to the center body 220 of the nail gun 108 by a set of couplers corresponding to couplers or screws 224 and 225. Holes 1810 and 1812 are for attachment of the interchangeable direct member securing element 1800 to the central body 220 of the nail gun 108 by another set of couplers corresponding to couplers or screws 238 and 240. Orientations of the interchangeable member securing element 1800 are shown in FIGS. 18B and 18C for attachment to the right side 232 (FIG. 2) of the center body 220 of the nail gun 108. In both FIG. 18B and FIG. 18C, the view is from above the nail gun 108 and holes not used for attachment are shown in dashed lines.

Figure 19C:
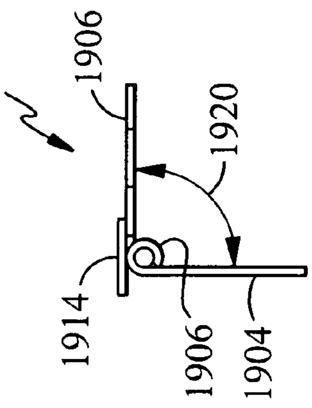
FIG. 19C is a schematic side view illustration of the member securing element if FIG. 19A, shown with the gripping portion and the retaining portion in a closed orientation.
Figure 19B:
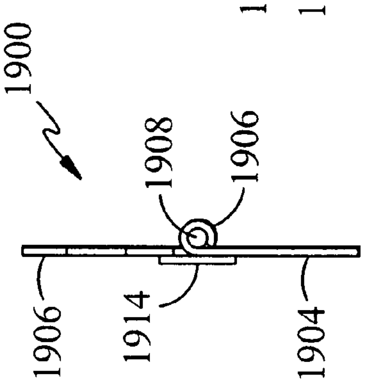
FIG. 19B is a schematic side view illustration of the member securing element of FIG. 19A, shown with the gripping portion and the retaining portion in an open orientation.
Figure 19A:
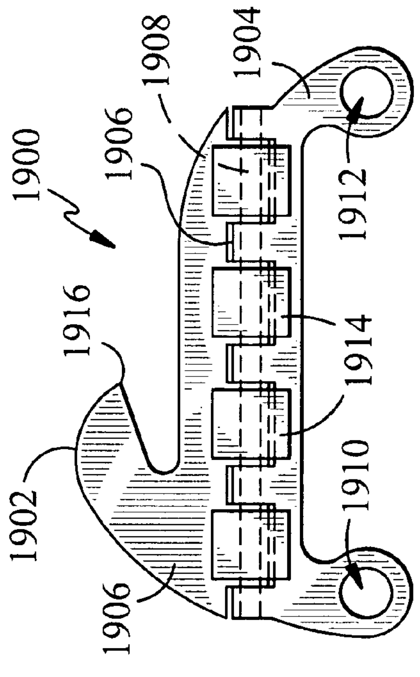
FIG. 19A is a schematic top view illustration of a member securing element for direct attachment to one set of accommodating upper screws of a tool, according to an embodiment of the present invention, including a gripping portion and a retaining portion hinged together.

FIG. 19A, FIG. 19B, and FIG. 19C illustrate a foldable embodiment of the present invention, FIG. 19A shows a top view of an upper direct member securing element 1900 for attachment to an upper portion 1704 of the center body 220 of the nail gun 108 by existing screws 224 and 225 in the nail gun 108 through holes 1910 and 1912. A gripping portion 1902 and a retaining portion 1904 are connected together by a hinge 1906 and a pin 1908. When the nail gun 108 is being used, the gripping portion 1902 is folded downward and out of the way, as indicated in FIG. 19C where the interior angle 1920 is substantially 90°. However, when there is need to hang the nail gun 108 on a stud 102, the gripping portion 1902 folds out until restrained by a stop 1914 from any further motion as shown in FIG. 19B, where the interior angle 1920 is restricted to less than substantially 180°. In this orientation, with the upper projection 1916 binding onto the stud 102, the hinge 1906 is held open by the weight by the nail gun 108.

Figure 20C:
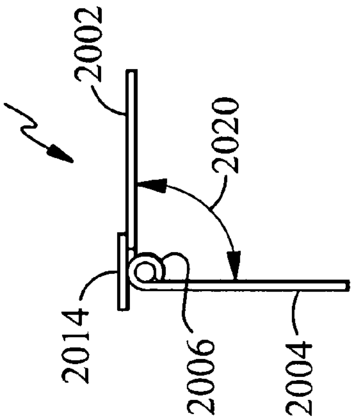
FIG. 20C is a schematic side view illustration of the member securing element of FIG. 20A, shown with the gripping portion and the retaining portion in a closed orientation.
Figure 20B:
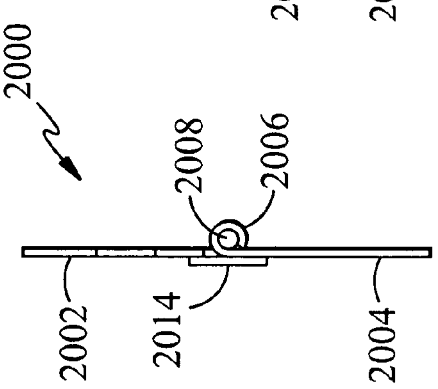
FIG. 20B is a schematic side view illustration of the member securing element of FIG. 20A, shown with the gripping portion and the retaining portion in an open orientation.
Figure 20A:
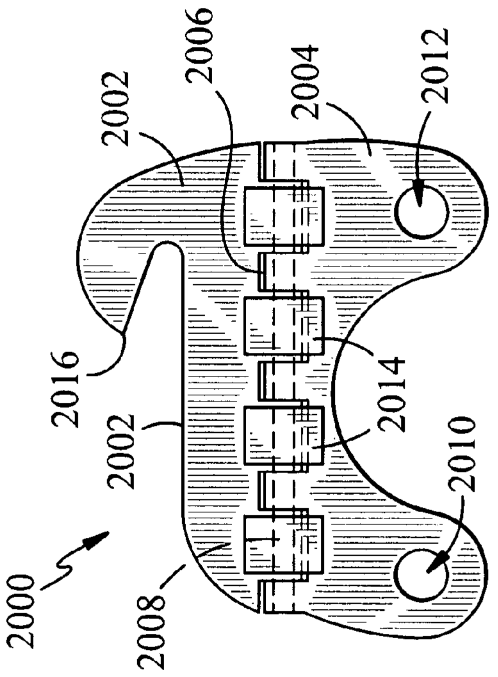
FIG. 20A is a schematic top view illustration of a member securing element for direct attachment to one set of accommodating lower screws of a tool, according to an embodiment of the present invention, including a gripping portion and a retaining portion hinged together.

Similarly, FIGS. 20A, 20B, and 20C illustrate the foldable embodiment of the present invention. FIG. 20A shows a direct member securing element 2000 for attachment to a lower portion 1706 of the central body 220 of the nail gun 108. There is a gripping portion 2002 and a retaining portion 2004 held together by a pin 2008 through a hinge 2006. When the nail gun 108 is being used, the gripping portion 2002 is folded downward and out of the way, as indicated in FIG. 20C where the interior angle 2020 is substantially 90°. When the nail gun 108 is meant to be hung on the stud 102, the hinge 2006 is held open by the stop 2014 and the projection 2016 binds onto the stud 102. As a result, hinge 2006 is held open as in FIG. 20B, where another interior angle 2020 is restricted to less than substantially 180°. FIG. 20C illustrates the hinge 2006 held in a semi closed position, as would be the case when the nail gun 108 were in use.

Although the invention has been described with respect to various embodiments, it should be realized that this invention is also capable of a wide variety of further and other embodiments within the spirit and the scope of the appended claims.

What is claimed is:

1. A combination tool and tool mounting device for temporarily and removably mounting the tool to a member, the combination comprising:

said tool having a tool body having a tool axis and a tool off-set center of gravity off-set from said tool axis;

said tool mounting device having a tool fastening element, said tool fastening element configured and arranged to removably secure said tool mounting device to the tool body;

said tool mounting device including a member securing element having at least two opposable protrusions extending from said member securing element, said at least two opposable protrusions having opposable gripping surfaces, said opposable gripping surfaces being longitudinally and laterally spaced apart from one another, with a first of said gripping surfaces being displaced laterally on a first side of said tool axis of said tool and a second of said gripping surfaces being displaced laterally on a second side of said tool axis of said tool, and said off-set center-of-gravity of said tool is located on said second side of said axis of said tool;

said tool mounting device further mounted on said tool at a location such that the off-set center of gravity of said tool lies outside a space between said opposable gripping surfaces and substantially within a plane of the space containing said opposable gripping surfaces; and said opposable gripping surfaces capable of engaging the member when the member is located between said opposable gripping surfaces and the tool rotates about the tool axis as a result of the off-set center of gravity of the tool, wherein rotation of said tool also rotates the tool mounting device and causes said first gripping surface and said second gripping surface to engage the member thereby temporarily and removably securing the tool to the member.

2. The combination of claim 1, wherein said first gripping surface is displaced longitudinally from said second gripping surface about said tool axis of said tool and said second gripping surface being closer to said tool off-set center-of-gravity than said first gripping surface.

3. A combination of a tool and at least two members securing elements for temporarily and removably mounting the tool to a member, the combination comprising:

said tool having a tool axis and a tool off-set center of gravity offset from said tool axis;

said at least two member securing elements coupled to said tool and said at least two member securing elements including a first member securing element protruding from said tool and having a first gripping surface and a second member securing element protruding from said tool and having a second gripping surface, said first gripping surface and second gripping surfaces being opposed to one another and spaced apart longitudinally and laterally from one another, said at least two member securing elements further being mounted on said tool at a location such that the off-set center of gravity of said tool lies outside a space between said first gripping surface and said second gripping surface and substantially within a plane of the space containing said first gripping surface and said second gripping surface; and said first gripping surface and said second gripping surface engages a member when the member is located between said first gripping surface and said second gripping surface when the tool rotates about said tool axis, wherein rotation of said tool about the tool axis as a result of the off-set center of gravity causes said first gripping surface and said second gripping surface to engage the member thereby temporarily and removably securing the tool to the member.

4. The combination of claim 3, the tool further including: a set of couplers; and another set of couplers; wherein said set of couplers and said other set of couplers are displaced longitudinally along a tool axis.

5. The combination of claim 4, wherein said first member securing element further includes: a plurality of holes, at least one of said plurality of holes being alignable with at least one of said set of couplers.

6. The combination of claim 5, wherein said second member securing element further includes: another plurality of holes, at least one of said another plurality of holes being alignable with at least one of said other set of couplers.

7. The combination of claim 3, wherein said first member securing element further includes: a gripping portion, said gripping portion including said first gripping surface and one or more gripping portion hinge elements; a retaining portion, said retaining portion including said two or more holes and one or more retaining portion hinge elements; a pin, said pin coupling said one or more gripping portion hinge elements with said one or more retaining portion hinge elements; and a stop, said stop coupled to said gripping portion wherein said stop restricts an interior angle between said gripping portion and said retaining portion to less than substantially 180 degree.

8. The combination of claim 3, wherein said second member securing element further includes: another gripping portion, said another gripping portion including said second gripping surface and another one or more gripping portion hinge elements; another retaining portion, said retaining portion including said another two or more holes and another one or more retaining portion hinge elements; a pin, said pin coupling said another one or more gripping portion hinge elements with said another one or more retaining portion hinge elements; and a stop, said stop coupled to said another gripping portion; wherein said stop restricts an interior angle between said another gripping portion and said another retaining portion to less than substantially 180 degree.

9. A tool mounting device for mounting a tool on a member, the tool having a tool axis and a tool off-set center of gravity from the tool axis, the tool mounting device comprising:

at least one removable tool fastening element having means to for removably affixing said tool mounting device to the tool;

a member securing element, said member securing element having at least two opposable protrusions extending from said member securing element, said at least two opposable protrusions having opposable gripping surfaces, said opposable gripping surfaces being longitudinally and laterally spaced apart from one another, with a first of said gripping surfaces being displaced laterally on a first side of said tool axis of said tool and a second of said gripping surfaces being displaced laterally on a second side of said tool axis of said tool when the tool is mounted on the member, the off-set center-of-gravity of the tool being located on the second side of said axis of the tool; and said tool mounting device, when mounted on said tool, is mounted thereon at a location such that the offset center of gravity of the tool lies outside a space between said opposable gripping surfaces and substantially within a plane of the space containing said opposable gripping surfaces, said opposable gripping surfaces capable of engaging the member when the member is located between said opposable gripping surfaces and the tool rotates about the tool axis as a result of the off-set center of gravity of the tool, wherein rotation of the tool also rotates the tool mounting device and causes said first gripping surface and said second gripping surface to engage the member thereby temporarily and removably securing the tool to the member.

10. The tool mounting device of claim 9, wherein said removable tool fastening element is a pipe cinch.

11. The tool mounting device of claim 9, wherein said removable tool fastening element is a strap.

12. The tool mounting device of claim 11, wherein said strap is a resilient strap.

13. The tool mounting device of claim 9, wherein said two or more gripping surfaces comprise at least one element tapering to a point.

14. The tool mounting device of claim 9, said tool mounting device further including: a slip-resistant layer.

15. The tool mounting device of claim 14, wherein said slip-resistant layer is Velcro®.

* * * * *